Jan. 3, 1928.　　　　　　　　　　　　　　　　　　　　　　1,654,900
L. J. SIVIAN
SYSTEM FOR SECRET SIGNALING
Filed April 23, 1925　　　　　3 Sheets-Sheet 1
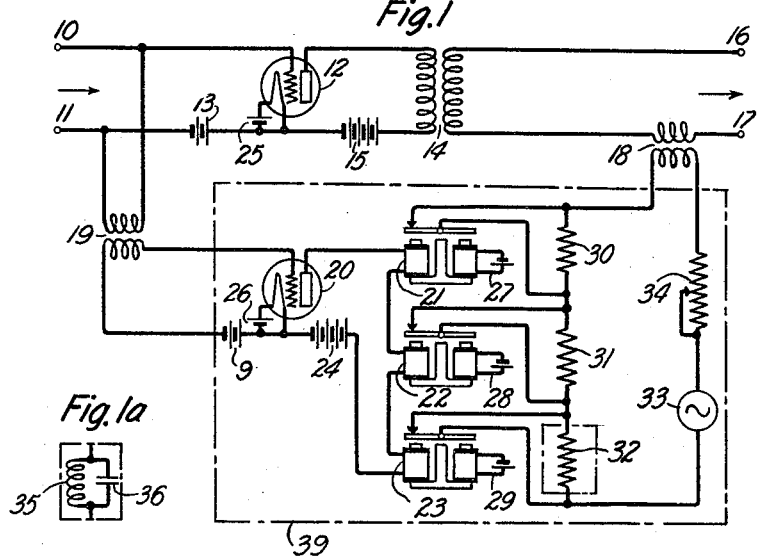
Fig.1
Fig.1a
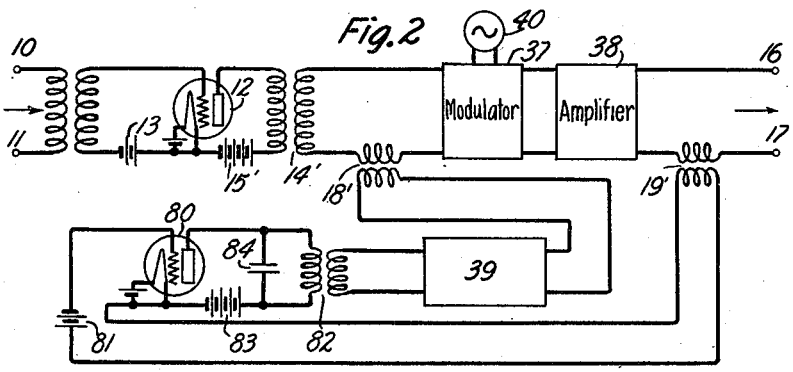
Fig.2
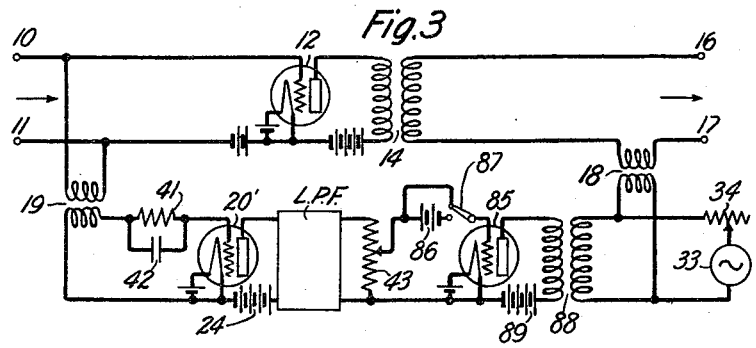
Fig.3
Inventor:
Leon J. Sivian
by E.W. Adams Atty.

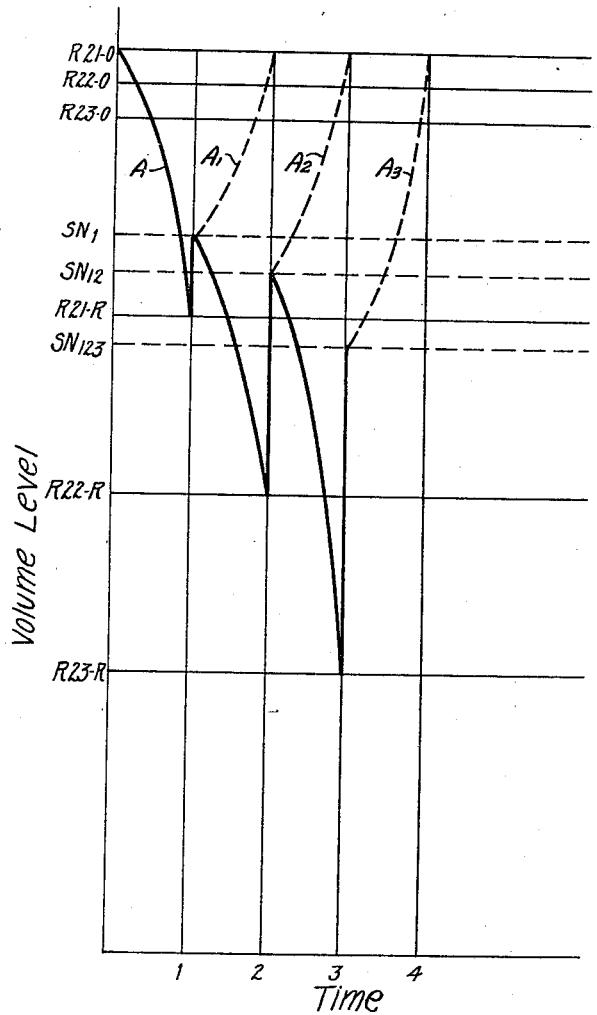

Jan. 3, 1928.

L. J. SIVIAN 1,654,900

SYSTEM FOR SECRET SIGNALING

Filed April 23, 1925

Inventor:
Leon J. Sivian
by _____ Att'y.

Patented Jan. 3, 1928.

1,654,900

UNITED STATES PATENT OFFICE.

LEON J. SIVIAN, OF BLOOMFIELD, NEW JERSEY, ASSIGNOR, BY MESNE ASSIGNMENTS, TO WESTERN ELECTRIC COMPANY, INCORPORATED, A CORPORATION OF NEW YORK.

SYSTEM FOR SECRET SIGNALING.

Application filed April 23, 1925. Serial No. 25,182.

This invention relates to systems for secret communication, and more particularly to means for combining and separating noise frequency waves and signal frequency waves.

Systems for obtaining secrecy in signaling have heretofore been devised, wherein the signals are obscured or rendered unintelligible, when received in the usual manner, by combining therewith noise waves.

The present invention utilizes the same general principle, in communication systems, to render secret the signals transmitted thereover, but applies this principle in a new and novel manner to effect results not heretofore obtained. The term signals, herein used, is intended to include speech, telegraph signals, music and the like or any portion of the frequency spectrum composing such signals.

It is a general object of this invention to secure privacy of communication.

Another object is to render messages unintelligible to persons unauthorized to receive them and to enable intelligible reception thereof by authorized persons.

A further object is to combine noise waves with signal waves to confuse the signals.

Another object is to remove the confusion from signal waves to enable the intelligible reception of signals.

An additional object is to transmit simultaneously with signal waves, noise waves of amplitude and frequency such as to cause masking of signals by noise in the ear of an unauthorized listener attempting to receive the signal waves.

A further object of the invention is to vary the volume of noise combined with signals in inverse proportion to the variations of volume of signals, whereby the total volume of noise and signal energy is maintained always within the limit of the maximum peaks of signal power.

A further object is the transmission of noise or confusion waves or currents with signal waves or currents without increasing the power capacity of or overloading the transmitting, receiving, or repeating apparatus.

A feature of this invention is a means for combining noise waves with signal waves in predetermined amounts in accordance with predetermined levels of signal energy.

Another feature is an arrangement for controlling the volume of noise in accordance with the volume of carrier waves modulated in accordance with signals.

A further feature relates to a system, whereby noise waves are combined with signal waves, the volume of noise waves being controlled in accordance with the volume of signals, whereby the volume of noise combined with signals is varied continuously and inversely as the signal volume. A still further feature is a receiving system including electrically resonant elements for separating noise waves from signal waves to enable the intelligible reception of signals.

Another feature is a receiving system including mechanically resonant elements for discriminating between signal and noise frequencies to effect the exclusion of noise waves from a signal receiver.

A further feature is an arrangement for increasing the selectivity of the resonant elements in the receiving system.

This invention operates upon the principle of interference between signal waves and noise waves. It is a well known characteristic of speech that only a relatively small percentage of the total speech time is occupied by the maximum or near maximum amplitudes in the speech waves. It is, therefore, evident that during the greater percentage of the speech time additional energy may be combined with the speech energy without the total energy exceeding that represented by the peaks of speech waves. Secrecy of signals in a system for transmitting speech is herein attained by introducing noise including components of suitable frequency and amplitude to obtain the greatest degree of masking of signals by noise. The noise is controlled as to the amplitude and frequency of its components by the amplitude of the speech. The frequency of the noise components is preferably related to the signal frequencies in such manner that advantage may be taken of the greater masking efficiency of low frequencies as compared to high frequencies.

The invention operates upon the further principle that signal waves may be masked or rendered unintelligible by applying to the ear of the listener at the proper instant, noise waves that are of the proper frequency and volume to produce a temporary overloading of the ear. In other words, by applying a sound wave of a particular frequency and of considerable volume to the ear of the listener, immediately preceding the application thereto of undistorted signal waves, advantage may be taken of the fact that a finite time is required for the ear to recover its normal sensitivity, to prevent the listener from hearing the signal even though it is unaccompanied at the particular instant by any material amount of noise.

In order to enable the reception of signals without the noise waves, which have been combined therewith, electrically or mechanically resonant elements are provided in connection with receiving systems of well-known character, for segregating the noise waves from the signal waves and excluding the former from the receiving devices.

In the drawings, Fig. 1 illustrates an arrangement for combining noise waves with signal waves, in fixed amounts, the volume of noise being determined by predetermined signal volume levels.

Fig. 1a illustrates a modification of one element of Fig. 1.

Fig. 2 illustrates an arrangement wherein the volume of noise is controlled in accordance with the amplitude of modulated carrier waves.

Fig. 2a is a graph illustrating the adjustment and operation of the circuit illustrated in Fig. 2.

In Fig. 3 an arrangement, for varying the volume of noise continuously and inversely in accordance with the volume of signals, is illustrated.

Figure 4:
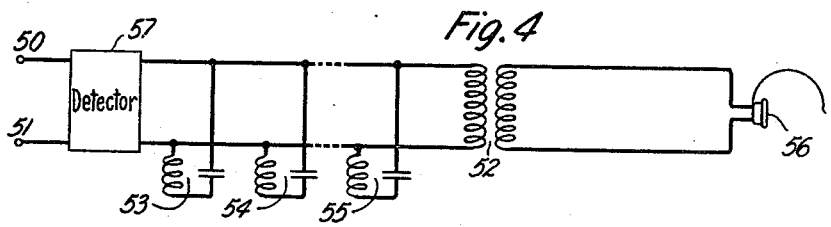

Fig. 4 illustrates a signal receiving system including electrically resonant elements for segregating noise and signal waves.

Figure 5:
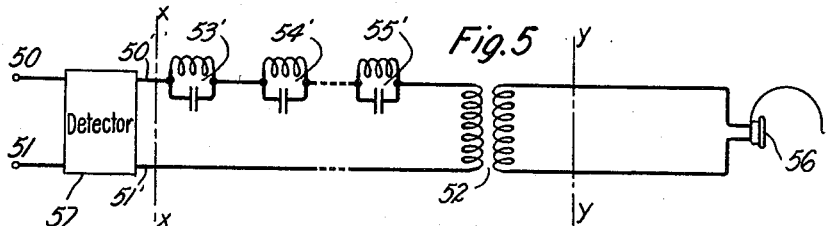

Fig. 5 illustrates a receiving system similar to Fig. 4.

Figure 6:
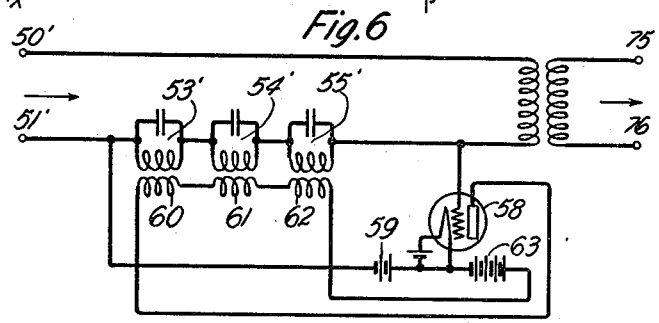

Fig. 6 illustrates a receiving circuit, for separating noise and signal waves, including electrically resonant elements coupled to a regenerative circuit for obtaining increased selectivity.

Figure 7:
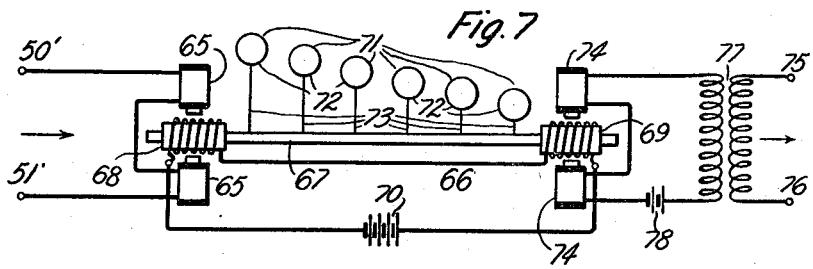

Fig. 7 illustrates a receiving circuit including mechanically resonant elements to discriminate between noise and signal waves.

The circuit of Fig. 1 will now be described. This circuit includes terminals 10 and 11 connected to the cathode and control electrode of space discharge device 12, which terminals are supplied with signal waves from any desired source as, for example, a telephone transmitter, a telephone line, an antenna or the like. The lead, connecting terminal 11 to the cathode of tube 12, includes a polarizing battery 13 for applying a suitable average potential to the control electrode of the tube. An output circuit for the device 12 is connected to its anode and cathode and includes the primary winding of transformer 14 in series with space current battery 15. The secondary winding of transformer 14 is connected to output terminals 16 and 17 in series with the primary winding of a transformer 18. The terminals 16 and 17 are arranged to supply signal waves combined with noise waves to any desired transmitting circuit such, for example, as an ordinary telephone line or a modulator, included in a radio or carrier current transmitting system, wherein the combined signal and noise waves are caused to modulate a high frequency carrier wave for transmission to a receiving system either over a wire line or through the ether.

A transformer 19 has its primary winding included in the input circuit of tube 12 and its secondary winding included in the input circuit of a second space discharge tube 20. The latter input circuit is connected to the cathode and control electrode of tube 20, and includes also the battery 9 for maintaining a suitable average potential upon the control electrode. An output circuit for tube 20 is connected to its anode and cathode and includes, in series, respective windings of polarized relays 21, 22, and 23 and space current battery 24. The cathode of tubes 12 and 20 may be heated in any suitable manner as, for example, by batteries 25 and 26 connected thereto respectively. Relays 21, 22, and 23 include polarizing windings connected respectively to direct current sources 27, 28, and 29 represented as batteries.

The primary winding of transformer 18 is included in a circuit comprising, in series, resistances 30, 31, 32, multiple frequency generator 33, and adjustable resistance 34. The resistances 30, 31 and 32 reduce to a negligible amount, the volume of noise energy transmitted from generator 33 through transformer 18 to the terminals 16 and 17.

The resistances 30, 31, and 32 are connected respectively to contacts and armatures of relays 21, 22, and 23 and are normally short-circuited thereby.

The batteries 27, 28 and 29 are, preferably, of such voltage as to supply a current to the polarizing windings of the associated relays in such direction that the magnetic field produced in the core of the relay in each case tends to oppose the field produced by the windings of these relays included in the output circuit of tube 20.

These batteries are also preferably of a voltage sufficient to polarize the respective windings in a manner to maintain the armature contacts thereof normally closed, for currents in the output circuit of tube 20 below certain predetermined values. These predetermined values may be different for each relay, as determined by the voltage of the respective batteries 27, 28, and 29, so that operation of each relay may take place at a different current level in the output circuit to cause the opening of its associated contacts. Upon the operation of each relay its associated resistance 30, 31 or 32 is effectively included in the circuit of generator 33. The amplitude of noise waves, supplied from generator 33 through transformer 18, to be combined with signal waves in the circuit connected to terminals 16 and 17, is thereby correspondingly reduced.

The level of current in the output circuit of tube 20 is determined by the potential applied to its control electrode by a source 9 and by signal waves supplied through transformer 19. It is clear, therefore, that the amplitude of the noise waves is controlled by variations in the amplitude of the signal waves.

In the operation of Fig. 1, signal waves supplied to terminals 10 and 11 are transmitted to the input circuit of space discharge tube 12, wherein they are amplified and supplied through transformer 14 to the output terminals 16 and 17. Signal waves are also supplied through transformer 19 to the input electrodes of tube 20 to control the space current flowing in the output circuit of this tube. When the negative potential applied to the control electrode of tube 20 by the battery 9 is reduced by the positive portions of the signal waves, the space current flowing in the winding of relay 21 may be such as to cause the operation of this relay, but relays 22 and 23 may remain inoperative for this particular value of space current. In this event, the armature of relay 21 opens the contact associated therewith to short-circuit resistance 30. A decreased current, therefore, flows in the circuit including generator 33 and primary winding of transformer 18, whereby currents of noise frequencies of a lower value are produced in the output path including the secondary windings of transformers 14 and 18, where they are combined with the signal waves present in this path.

As the space current in tube 20 is still further increased by increasing signal potentials applied to the input circuit of the tube, the relays 22 and 23 will operate, in the manner described in connection with relay 21, to include the respective resistances 31 and 32 in series with generator 33 and thereby reduce the noise currents flowing in the circuit in steps to a substantially negligible value.

In this manner, the volume of noise combined with the signals is determined by the volume level of the signals, and is varied inversely as the signal volume; also, since at the peaks of signal power the noise currents are reduced to a negligible amount, the total power transmitted, including both noise and signal power, never exceeds the peaks of signal power.

By virtue of this fact, the apparatus included in a signaling system embodying the present invention need not be designed to handle a greater amount of power than would be required without the application of noise currents. This advantage is of particularly great importance in signaling systems of high power, wherein the expense of providing the necessary facilities increases rapidly with increase of power capacity.

The generator 33 may be designed to provide waves of any desired frequency, but it is preferably designed to generate waves of a plurality of frequencies, spaced within the audible range and including those frequencies which are found to be most effective in masking speech components. By doing this the number of components of different frequency necessary in the noise wave to produce complete masking of signals is materially reduced.

In a practical arrangement, this generator may be designed to produce waves having frequencies of 450 cycles, 600 cycles, 725 cycles, 1000 cycles, 1500 cycles, and 2100 cycles. These frequencies however, may differ in number and value without substantial change in the effectiveness of the system.

In order to further insure complete secrecy the different frequencies composing the noise may be varied in the manner described in Patent No. 1,461,783, issued to R. D. Parker et al., July 17, 1923.

In Fig. 1$^a$, a device which comprises a resonant circuit including an inductance 35 in shunt to a condenser 36, may be substituted for the element 32 included within the small dotted rectangle in Fig. 1. The inductance 35 and condenser 36 constitute an anti-resonant circuit, which may be tuned as desired to any one of the frequencies produced by generator 33, but is preferably resonant at a frequency of 1000 cycles per second. Let it be assumed that at a particular instant the volume of signals is such as to cause the operation of relays 21, 22, and 23, a subsequent reduction in the signal volume below preassigned values will then cause the successive release of these relays, and the successive short-circuiting of their associated resistances 30, 31, and 32 and accordingly the successive increase in volume of noise supplied to terminals 16 and 17. If the device of Fig. 1$^a$ is assumed to be substituted in the circuit of Fig. 1 in place of resistance 32, the noise waves supplied to terminals 16 and 17 would normally not include a component having the frequency of 1000 cycles, since this component would be impeded by the resonant circuit 35, 36. However, when relay 23 causes the resonant circuit to be short-circuited, waves of the frequency of 1000 cycles and of large volume, will be included among the noise frequencies. The volume of noise, supplied under these circumstances, together with the signal waves, may be such as to cause the listener's ear to be temporarily unable to interpret intelligible signals of considerable volume supplied thereto immediately succeeding the application of the large volume of noise. It is thus apparent that this invention makes use of the intervals when the signal volume is low to prevent a listener from hearing signals when the signal volume is high, and the noise volume is low.

In Fig. 2, an arrangement for combining noise waves with signal waves is illustrated, wherein a space discharge amplifier 12 has its input circuit connected to terminals 10 and 11 in the manner illustrated in Fig. 1. This amplifier also includes in its output circuit the primary winding of a transformer 14' in series with a space current source 15'. The secondary winding of transformer 14' may be included in the input circuit of a space discharge tube modulator of any well-known type such for example, as that described in Patent No. 1,350,752 to H. J. Van Der Bijl, issued August 24, 1920, represented by block 37 in series with the primary winding of a transformer 18'. The modulator 37 may have its output circuit connected to the input circuit of a space discharge tube amplifier 38 which is designed to efficiently translate and amplify high frequency waves and may be in general similar to the amplifier 12. The output circuit of this amplifier may include the primary winding of a transformer 19' and may be connected to output terminals 16 and 17. The secondary winding of transformer 19' is included in the input circuit of a space discharge tube 80 in series with a grid polarizing battery 81. The output circuit of the tube connected to its anode and cathode, includes, in series, the primary winding of transformer 82 and space current battery 83. The transformer winding is shunted by a by-pass condenser 84 of low impedance for high frequency waves, i. e. carrier and side band frequencies. An arrangement, represented by block 39, identical with that illustrated as included within the large broken line rectangle 39 of Fig. 1 may be provided and connected to the respective secondary and primary windings of transformers 82 and 18' as shown.

When the arrangement in Fig. 2 is in operation signal waves supplied to terminals 10 and 11, are transmitted through amplifier 12 and transformer 14' to modulator 37, where they are combined with carrier waves from source 40 to produce signal modulated carrier waves in the output circuit thereof. The latter waves are supplied through amplifier 38 to transformer 19' and terminals 16 and 17.

The arrangement represented by block 39, which includes the amplifier 20 and relays 21, 22 and 23, such as those included within the large broken line rectangle of Fig. 1, includes input terminals connected to the secondary winding of transformer 82 and output terminals connected to the noise current circuit including the primary winding of transformer 18'. In this case, signal modulated carrier waves, instead of signal waves, are supplied through transformer 19' to the input circuit of tube 80. These modulated waves are detected by device 80 and the space current thereof accordingly varies with the amplitude or volume of signals as was the case in Fig. 1. High frequency components of the space current pass through condenser 84 but low frequency variations are transmitted through transformer 82 to the input circuit of tube 20 to control the operation of relays 21, 22 and 23, and thereby the level of noise supplied through transformer 18' to the input circuit of modulator 37. The relays 20, 21, and 22 used in connection with Fig. 2 preferably have different margins of operation and release as indicated on the graph shown in Fig. 2ª. This is desirable in order to prevent chattering of the relays and the production of an unstable condition in the circuit. For example, referring to Fig. 2ª relay 21 may be designed to operate on a current in the plate circuit of tube 20 corresponding to a volume level in the output circuit connected to terminals 16 and 17 represented by abscissa R21—O and to release at a level represented by abscissa R21—R. Likewise relay 22 may operate at a level represented at R22—O and release at a level indicated by R22—R. Relay 23 would then operate at the level R23—O and release at the level R23—R.

Assume that the signal level at the zero time ordinate has its maximum value at the point R21—O as shown by curve A. Relays 21, 22 and 23 then all operate under this condition and substantially no noise is combined with the signals in the modulator input circuit because resistances 30, 31 and 32 are all included in the noise current circuit. The signal level may now fall to a point R21—R before any relay releases. When this point is passed relay 21 releases. This causes noise to be combined with the signals to bring the total level of noise and signal to a point, for example, $SN_1$. If this level of signal and noise rises to R21—O, see dotted curve $A_1$, relay 21 will again operate and remove the noise. If, on the other hand, the level of signal and noise falls below the level R22—R then relay 22 releases and adds noise to bring the combined level of signal and noise, to a point $SN_{12}$, for example. If this level now rises to or above R22—O, see dotted curve $A_2$, relay 22 operates and cuts off the corresponding amount of noise. If it rises to R21—O relays 21 and 22 both operate and cut off all noise. Similarly, if the level of combined noise and signal falls to R23—R, noise is added to bring the combined level again to some point $SN_{123}$ and if the level rises above any one of the values R23—O, R22—O or R21—O the corresponding amounts of noise will be removed.

In Fig. 3 an arrangement, in many respects similar to that of Fig. 1, is illustrated. However, in this instance, the input circuit of tube 20', which is coupled by transformer 19 to the terminals 10 and 11, includes a grid leak resistance 41 shunted by a condenser 42 and the output circuit of tube 20' includes, in place of the windings of relays 21, 22 and 23, a low pass filter LPF and a resistance 43. The filter LPF is designed to pass frequencies below the audible range and to attenuate frequencies within and above the audible range.

The resistance 43 is included in the input circuit of a second tube 85 in series with a polarizing battery 86 which is normally short-circuited by a switch 87. The negative voltage produced by the drop in potential along resistance 43 may be adjusted so as to cause tube 85 to operate on a curved portion of its characteristic curve. Otherwise the battery 86 may be included in the grid circuit by opening switch 87 and this battery then may have a voltage such that in conjunction with the drop in potential in resistance 43 the desired voltage is supplied to the grid of tube 85. The output circuit of the tube 85 includes the primary winding of transformer 88 in series with battery 89. The secondary winding of transformer 88 is included in a circuit comprising multiple frequency generator 33 and adjustable resistance 34. Transformer 18 has its primary winding connected in parallel with the secondary winding of transformer 88 and its secondary winding connected in series with the secondary winding of transformer 14, whereby noise currents may be supplied from the generator 33 to the terminals 16 and 17 to be combined with signal waves. The secondary winding of transformer 88 constitutes a variable impedance shunt for the primary winding of the transformer 18, whereby the volume of noise transmitted through the latter may be varied. The impedance of transformer 88 is controlled by varying the impedance of the space path of tube 85 connected to its primary winding, and this is accomplished by varying the potential of the tube control electrode in inverse proportion to the amplitude of variations in the space current of tube 20' supplied to its input circuit by the resistance 43. The variations in the space current of tube 20' are proportional to the variations in amplitude of the signal waves.

As the volume of signal waves supplied to the input circuit of tube 20' increases, the amplitude of the space current of tube 20' increases accordingly. The negative potential established upon the control electrode of tube 85 by the drop in potential in resistance 43 is accordingly reduced. The reduction in this negative potential on the control electrode causes a corresponding reduction in the impedance of the space path of the tube, which reduction is reflected in the impedance of the secondary winding of transformer 88, as viewed from the terminals of the primary winding of transformer 18. Hence, more of the noise currents are shunted through the winding of transformer 88 with a consequent reduction in the volume of noise supplied through transformer 18. It is thus seen that the volume of noise which is combined with signals in the output path including terminals 16 and 17, is varied continuously and inversely in accordance with the volume of the signal energy itself. The absolute volume of noise energy may be adjusted in this arrangement as well as in those described in Figs. 1 and 2 by means of adjustable resistance 34 to obtain the proper masking of signals by noise waves.

The principal function of filter LPF is to exclude distorted signal frequencies from the noise circuit including generator 33.

The generator 33 of Figs. 1, 2, and 3 may be replaced by a plurality of generators, each arranged to generate a wave of a single frequency. In addition, in order to provide a further insurance against the unauthorized reception of signals, the frequencies of the waves consisting of the noise current, may be varied in any desired manner, as already mentioned.

Also, any additional desired number of relays corresponding to relays 21, 22, and 23 may be provided in order to increase the number of adjustments in the volume of noise.

The receiving circuit illustrated in Fig. 4 includes input terminals 50 and 51 arranged to be associated with a source of carrier waves modulated by signal and noise waves or to a source of signal and noise waves, for example, an antenna, a wire line, or the like. The terminals 50 and 51 are connected to the input circuit of the detector 57 which may be any well-known form of detecting device, such as a space discharge tube arranged in the same general manner as tube 20'. The output terminals of the detector 57 are connected to the primary winding of transformer 52 by a path including shunt resonant elements 53, 54 and 55, each including an inductance in series with a capacity. These resonant elements are preferably tuned to the respective frequencies constituting the noise, whereby they offer low impedance shunt paths thereto for diverting waves of these frequencies from the primary winding of transformer 52. Although only three of these elements are illustrated, it is, of course, necessary to provide as many elements as there are different frequencies constituting the noise. Additional elements may be connected in the manner illustrated and tuned to the additional noise frequencies. The secondary winding of transformer 52 is connected to a receiving device 56 illustrated as a telephone head receiver.

Modulated carrier waves including noise and signal frequencies, when received at terminals 50 and 51, are supplied to detector 57. In the output circuit of this detector, there are produced, in a manner now well understood, currents including signal frequency and noise frequency components which, if applied to an ordinary receiver, would be unintelligible to a listener. However, as these waves are transmitted over the path connecting the detector to the transformer 52, the noise frequency components are greatly attenuated by the resonant paths 53, 54, and 55, whereas almost all of the currents of signal frequencies, to which these elements offer high impedance, are transmitted without substantial attenuation. Accordingly, these waves are received by device 56 and produce audible sounds representing the signals.

Should the terminals 50 and 51 be connected to an ordinary telephone line and supplied with signal waves combined with noise currents, the detector 57 may be omitted, since it is not necessary to detect unmodulated waves in order to obtain the signals.

The receiving circuit illustrated in Fig. 5 corresponds to that illustrated in Fig. 4 with the exception that the resonant elements 53, 54 and 55 are omitted, and other resonant elements 53′, 54′, and 55′ are substituted. The latter elements comprise anti-resonant circuits having inductance in shunt to capacity and tuned to the respective noise frequencies and included in series in one lead of the path connecting the detector 57 to the transformer 52. Additional anti-resonant circuits similar to the ones indicated and tuned to additional noise frequencies may be provided as required.

The anti-resonant circuits offer high impedance to waves of the frequency to which they are tuned, but low impedance to waves of frequencies differing materially therefrom. By virtue of this fact, currents of noise frequencies are greatly impeded in the input path between the detector and the transformer, whereas currents of signal frequencies are substantially unimpeded therein. As a result, the receiver 56 is supplied substantially only with signal waves to which it responds producing an audible signal.

Fig. 6 illustrates a modification of the portion of the circuit of Fig. 5 shown between the dotted lines X—X and Y—Y. The space discharge tube 58 has included in its input circuit, connected to its control electrode and cathode, the resonant elements 53′, 54′, and 55′ in series with the polarizing battery 59. In its output circuit, connected to its anode and cathode, there are included the windings 60, 61, and 62 in series with space current battery 63. The windings 60, 61, and 62 are respectively coupled to the inductances of the elements 53′, 54 and 55′. The waves of noise frequency applied to the input circuit of tube 58 are amplified therein and are fed back from the output circuit of the tube to the anti-resonant circuits 53′, 54′, and 55′ included in the input circuit. By virtue of this feeding-back of energy to the anti-resonant circuits, their impedance to waves of noise frequency is increased with the result that their discrimination to the noise components is correspondingly increased. However, since the voltage of signal waves at the terminals of circuits 53′, 54′ and 55′ is low, little if any energy of these frequencies is transmitted to the input circuit of tube 58. This arrangement therefore provides a sharper discrimination between noise and signal frequencies, whereby the noise frequencies are more completely suppressed, whereas the signal frequencies are more completely transmitted. It is to be understood that additional resonant elements, similar to those illustrated, may be provided in order to suppress all of the noise frequencies that may be present in the circuit.

The receiving circuit, illustrated in Fig. 7, may likewise be substituted for the portion of the circuit of Fig. 5 included between the dotted lines X—X and Y—Y. This circuit includes a mechanically resonant system for discriminating between noise and signal frequencies. The terminals 50′ and 51′ are arranged to receive signal and noise waves combined which are supplied to the windings of field magnet 65. An armature 66 comprises a magnetic bar 67 including windings 68 and 69 upon its opposite ends, which windings are connected in series to a battery 70. Upon the bar 67 are mounted tuned reeds 71 comprising weights 72 and springs 73. The various reeds are tuned to mechanical resonance at the respective noise frequencies.

A receiving magnet 74 includes in its magnetic field the winding 69 and is itself provided with windings connected in a circuit including the primary winding of transformer 77 and a battery 78. Battery 78 produces a flow of current in the windings of magnet 74, whereby a constant magnetic field is established between its poles.

When alternating currents including, for example, noise and signal frequency components are supplied to the terminals 50′ and 51′, a corresponding alternating magnetic field is established between the poles of magnet 65. This varying magnetic field establishes mechanical forces in the conductors of coil 68 by virtue of the current flowing therein, which forces contain varying components having the frequency of the component waves supplied to the magnet 65. These forces tend to establish longitudinal mechanical vibration of armature 67 at the various frequencies. However, by virtue of the resonant reeds 71, high impedance is offered to vibrations of the frequencies to which these reeds are tuned, namely, the noise frequencies. However, materially less impedance is offered to waves of other frequencies, i. e. signal frequencies, whereby the vibrations at these frequencies are transmitted to the coil 69. The vibration of coil 69 in the field of magnet 74 induces in the windings of this magnet currents including components of the signal frequencies without components of the noise frequencies. The waves represented by these currents are then transmitted through transformer 77 to terminals 75 and 76, to which a receiving device may be connected.

The principles of this invention as described in connection with the particular embodiments illustrated are applicable to still other modifications that will readily occur to persons skilled in the art. Therefore, the scope of the invention is to be determined only as indicated by the appended claims.

What is claimed is:

1. In a signaling system, a source of signal waves, a source of noise waves, means for combining said noise waves with said signal waves, and means independent of said first mentioned means for controlling the amplitude of noise waves in accordance with the amplitude of signal waves.

2. In a signaling system, a source of signaling waves, a source of noise waves including a plurality of waves of different frequency, a path traversed by both said noise and signal waves, and means including a variable resistance controlled by a variable impedance device for varying the amplitude of noise waves in said path.

3. In a signaling system, a source of noise waves, a source of variable amplitude signal waves, means for combining waves from both said sources, said means including a variable impedance for varying the amplitude of the combined noise waves in inverse proportion to the variations in amplitude of said signal waves.

4. In a signaling system, a transmitting station and a receiving station, a source of signal waves at said transmitting station, means for transmitting said signal waves to said receiving station, a signal receiver at said receiving station, a source of noise frequency waves, said source being controlled by a variable impedance device supplied with signal waves whereby noise waves may be combined with the signal waves transmitted to said receiving station, and means at said receiving station including frequency selective elements for excluding waves of noise frequency from said receiving device.

5. In a signaling system, a receiving circuit supplied with signal waves rendered unintelligible by combined noise frequency waves, a selective path designed to exclude noise frequency waves but to transmit signal frequency waves, said path including a plurality of anti-resonant circuits in series to discriminate against said noise frequency waves, a space discharge tube including an input circuit and an output circuit, said anti-resonant circuits being included in said input circuit, and a feed-back connection from said output circuit to said input circuit whereby the efficiency of said anti-resonant circuits to discriminate against said noise frequency waves is substantially increased.

6. A source of signal waves, a source of noise waves, means for controlling the amplitude of noise waves, said means including an impedance traversed by said noise waves, and means for varying said impedance in predetermined steps.

7. In a signaling system, a source of signal waves and a source of noise waves, a transmission circuit traversed by said signal waves and an auxiliary circuit traversed by said noise waves, a coupling between said circuits whereby noise waves are combined with signal waves, a control circuit supplied with said signal waves, means for coupling said control circuit to said auxiliary circuit, said means being connected in shunt to said first mentioned coupling, means to vary the amplitude of noise waves supplied to said transmission circuit.

8. The method of secret signaling which comprises, combining, with signal waves, noise waves of a plurality of discrete frequencies and varying the amplitude of noise waves in inverse proportion to variations in amplitude of signal waves.

9. The method of secret signaling which comprises combining, with signal waves, noise waves including a plurality of different frequency components and separately controlling the amplitude of the component frequencies of the noise waves by said signal waves.

10. The method of rendering signals unintelligible which comprises combining with signal waves, noise waves, and varying the amplitude of said noise waves in inverse proportion to the amplitude of said signal waves.

11. The method of secret signaling which comprises generating signal waves of varying energy content, combining noise waves with said signal waves, and varying the energy content of said noise waves whereby the combined energy of noise and signal waves is maintained substantially constant.

12. In a secret signaling system, a source of signal waves, a transmission path for said waves, a second path coupled to said transmission path, said second path including a space discharge device having an input circuit coupled to said source and an output circuit, a plurality of marginal relays in said output circuit, contacts controlled by said relays, a source of noise waves of a plurality of frequencies, and a circuit connected to said source including a plurality of impedance elements, said impedance elements being arranged to be rendered ineffective in said circuit under control of the contacts of said relays.

In witness whereof, I hereunto subscribe my name this 20th day of April A. D., 1925.

LEON J. SIVIAN.